(12) United States Patent
Wei

(10) Patent No.: US 10,088,122 B1
(45) Date of Patent: Oct. 2, 2018

(54) INTEGRATED LAMP

(71) Applicant: JUTE INDUSTRIAL CO., LTD., Taichung (TW)

(72) Inventor: Shih-Chieh Wei, Taichung (TW)

(73) Assignee: JUTE INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 15/669,365

(22) Filed: Aug. 4, 2017

(51) Int. Cl.
| | |
|---|---|
| *F21S 43/14* | (2018.01) |
| *F21S 43/19* | (2018.01) |
| *F21S 43/20* | (2018.01) |
| *F21S 43/15* | (2018.01) |
| *F21S 41/40* | (2018.01) |
| *F21V 3/00* | (2015.01) |
| *F21V 5/04* | (2006.01) |
| *B60Q 1/44* | (2006.01) |
| *F21S 43/236* | (2018.01) |
| *F21Y 115/10* | (2016.01) |

(52) U.S. Cl.
CPC ................. *F21V 3/00* (2013.01); *B60Q 1/44* (2013.01); *F21S 41/40* (2018.01); *F21S 43/14* (2018.01); *F21S 43/15* (2018.01); *F21S 43/19* (2018.01); *F21S 43/195* (2018.01); *F21S 43/20* (2018.01); *F21S 43/236* (2018.01); *F21V 5/04* (2013.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 5,159,478 | A * | 10/1992 | Akiyama | G02F 1/133504 349/106 |
| 6,082,885 | A * | 7/2000 | Belfer | F21V 7/00 362/297 |
| 6,386,720 | B1 * | 5/2002 | Mochizuki | G01D 11/28 349/65 |
| 6,533,445 | B1 * | 3/2003 | Rogers | B60Q 1/2696 362/485 |
| 6,789,921 | B1 * | 9/2004 | Deloy | G02F 1/133603 362/238 |
| 8,235,541 | B2 * | 8/2012 | Chen | G02F 1/133603 349/61 |
| 8,733,970 | B2 * | 5/2014 | Kim | G02B 6/0051 349/62 |
| 2002/0113244 | A1 * | 8/2002 | Barnett | F21L 4/027 257/98 |

(Continued)

*Primary Examiner* — Daniel Walsh

(74) *Attorney, Agent, or Firm* — Muncy, Geissler, Olds & Lowe, P.C.

(57) ABSTRACT

An integrated lamp is provided, including: a shell member, defining a mounting space; a light-evening member, disposed within the mounting space, including an incident portion and a light-penetrable region; a first LED unit, disposed within the mounting space, at least part of light from the first LED unit being incident into the incident portion and diffused within the light-penetrable region to become a surface light source; a second LED unit, disposed within the mounting space, overlapping with the light-penetrable region, configured to light to form at least one point light source; wherein the light form the first LED unit and the light form the second LED unit emit out from the light-penetrable region, at the same time or respectively.

2 Claims, 4 Drawing Sheets

(56) References Cited

U.S. PATENT DOCUMENTS

| | | | |
|---|---|---|---|
| 2003/0030063 A1* | 2/2003 | Sosniak | B60J 3/0282 257/89 |
| 2004/0201025 A1* | 10/2004 | Barnett | F21V 3/04 257/79 |
| 2005/0013140 A1* | 1/2005 | Currie | B60Q 1/32 362/495 |
| 2005/0207166 A1* | 9/2005 | Kan | F21V 5/002 362/373 |
| 2005/0281025 A1* | 12/2005 | Coushaine | F21K 9/00 362/227 |
| 2006/0007704 A1* | 1/2006 | Mori | G02B 6/0013 362/613 |
| 2006/0012486 A1* | 1/2006 | Gibson | G08B 5/006 340/815.45 |
| 2007/0291198 A1* | 12/2007 | Shen | G09G 3/3413 349/69 |
| 2008/0089060 A1* | 4/2008 | Kondo | F21V 17/107 362/231 |
| 2008/0259609 A1* | 10/2008 | Chang | G02F 1/133603 362/307 |
| 2008/0278941 A1* | 11/2008 | Logan | F21V 5/00 362/234 |
| 2009/0052199 A1* | 2/2009 | Bolander, Jr. | B60Q 1/2607 362/509 |
| 2009/0141211 A1* | 6/2009 | Furuya | G02B 5/305 349/64 |
| 2009/0290348 A1* | 11/2009 | Van Laanen | H05K 1/0203 362/249.02 |
| 2010/0019689 A1* | 1/2010 | Shan | G09F 9/33 315/294 |
| 2010/0079980 A1* | 4/2010 | Sakai | G02B 6/0016 362/97.1 |
| 2010/0123847 A1* | 5/2010 | Jeong | G02B 6/0091 349/58 |
| 2010/0254138 A1* | 10/2010 | Chen | F21V 5/007 362/236 |
| 2011/0051397 A1* | 3/2011 | Bae | G02F 1/133603 362/97.1 |
| 2011/0149570 A1* | 6/2011 | Wenzlick | F21L 14/023 362/249.02 |
| 2011/0242463 A1* | 10/2011 | Park | G02B 5/0263 349/106 |
| 2011/0286214 A1* | 11/2011 | Quinlan | F21S 8/04 362/235 |
| 2013/0020462 A1* | 1/2013 | Kim | F21K 9/13 250/205 |
| 2013/0094242 A1* | 4/2013 | Yang | G02F 1/1336 362/602 |
| 2014/0085886 A1* | 3/2014 | Kothmeier | F21V 14/06 362/237 |
| 2015/0138770 A1* | 5/2015 | Kwak | F21V 5/04 362/244 |
| 2015/0159838 A1* | 6/2015 | Wu | F21V 15/01 362/235 |
| 2016/0059767 A1* | 3/2016 | Kwak | B60Q 1/2638 362/520 |
| 2016/0307879 A1* | 10/2016 | Lien | H01L 25/0753 |
| 2017/0292664 A1* | 10/2017 | Pearson | F21V 5/04 |

\* cited by examiner a# INTEGRATED LAMP

BACKGROUND OF THE INVENTION

Field of the Invention

The present invention relates to an integrated lamp.

Description of the Prior Art

Lamp can light and serve as an alarm. For example, the brake light lights when a brake is made, to alarm people behind to slow down for safety.

In conventional structures, the lamp is generally provided with a light bulb thereinside. When braking, the light bulb lights to alarm people behind. However, the conventional light bulb has low luminance, and the conventional light bulb is easy to degrade, energy-consuming and non-durable. Besides, the conventional lamp can light only in a single mode, thus providing poor alarming effect.

The present invention has arisen to mitigate and/or obviate the afore-described disadvantages.

SUMMARY OF THE INVENTION

The major object of the present invention is to provide an integrated lamp, which provides two kinds of LED units within a light-penetrable region, for appearing various emitting modes (surface light source and point light source), and which is small in size, durable and energy-saving, and provides great brightness.

To achieve the above and other objects, an integrated lamp of the present invention is provided, including: a shell member, defining a mounting space; a light-evening member, disposed within the mounting space, including an incident portion and a light-penetrable region; a first LED unit, disposed within the mounting space, at least part of light from the first LED unit being incident into the incident portion and diffused within the light-penetrable region to become a surface light source; a second LED unit, disposed within the mounting space, overlapping with the light-penetrable region, configured to light to form at least one point light source; wherein the light form the first LED unit and the light form the second LED unit emit out from the light-penetrable region, at the same time or respectively.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
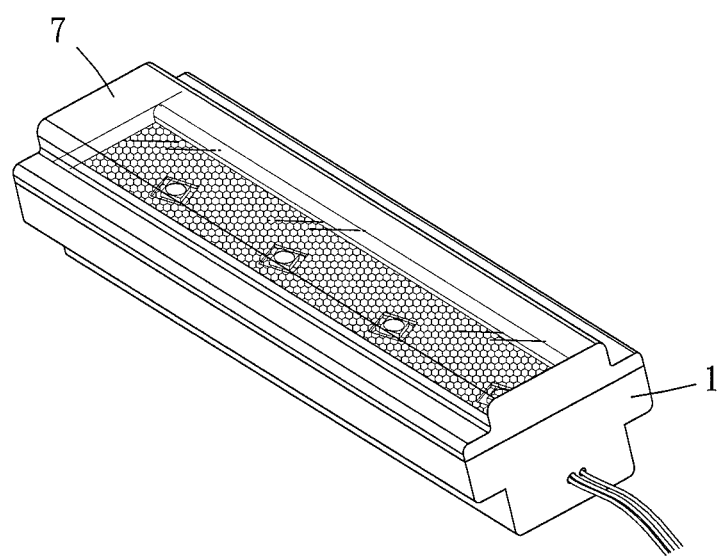
FIG. 1 is a perspective drawing of a first preferred embodiment of the present invention.
Figure 2:
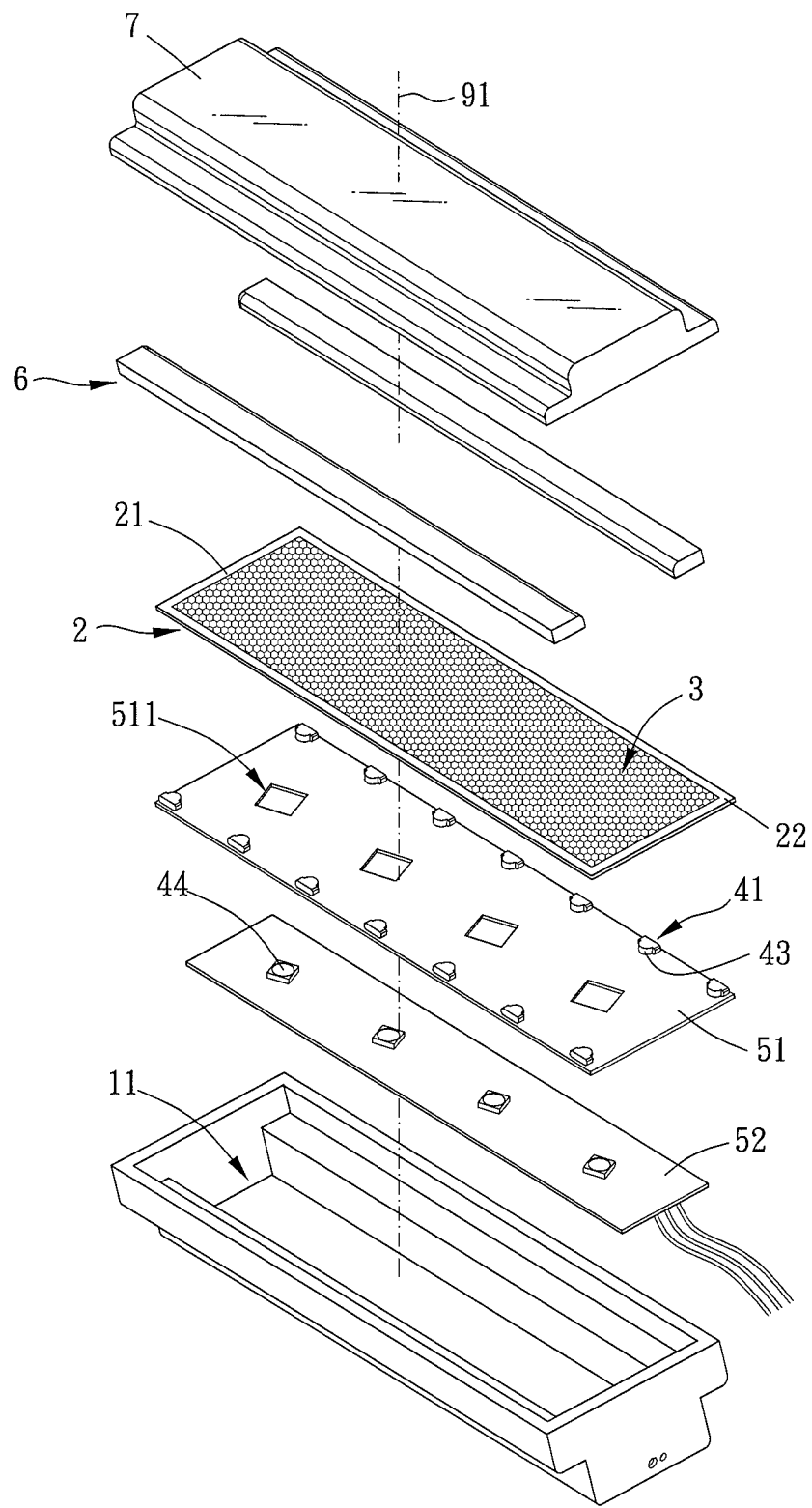
FIG. 2 is a breakdown drawing of FIG. 1.
Figure 3:
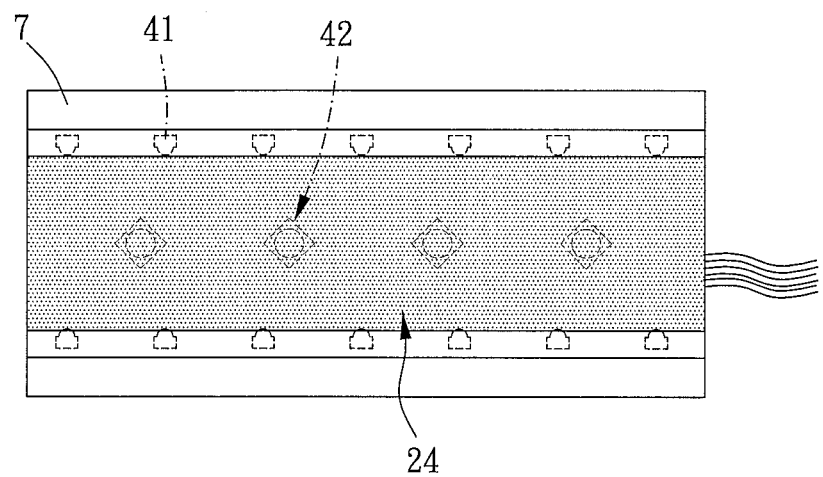
FIG. 3 is a drawing showing a first LED unit which lights as a surface light source according to the first preferred embodiment of the present invention.
Figure 4:
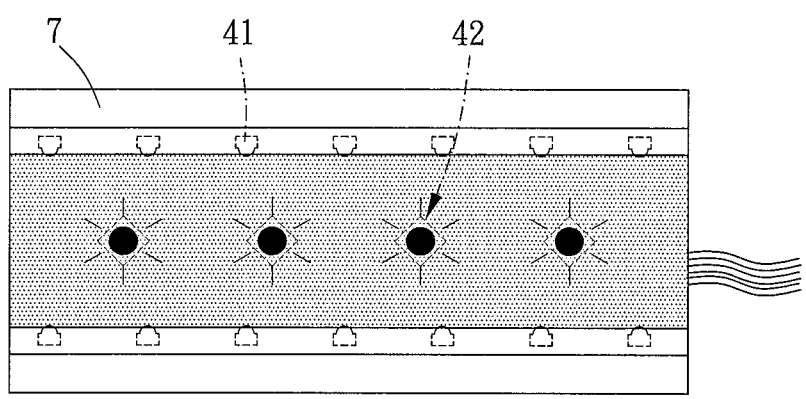
FIG. 4 is a drawing showing that first and second LED units light at the same time according to the first preferred embodiment of the present invention.
Figure 5:
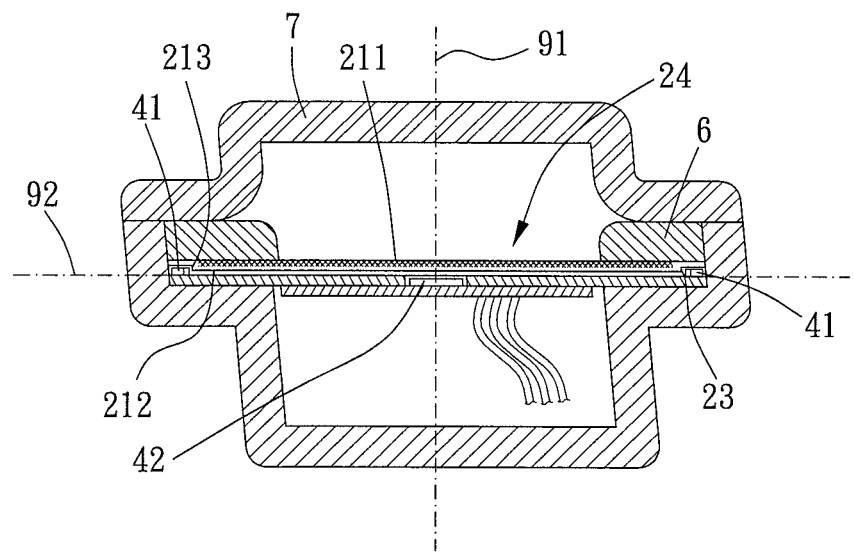
FIG. 5 is a cross-sectional drawing of FIG. 1.

The present invention will be clearer from the following description when viewed together with the accompanying drawings, which show, for purpose of illustrations only, the preferred embodiment in accordance with the present invention.

Please refer to FIGS. 1 to 5 for a preferred embodiment of the present invention. An integrated lamp 1 includes a shell member 1, a light-evening member 2, a first LED unit 41 and a second LED unit 42.

The shell member 1 defines a mounting space 11. The light-evening member 2 is disposed within the mounting space 11 and includes an incident portion 23 and a light-penetrable region 24. The first LED unit 41 is disposed within the mounting space 11, and at least part of light from the first LED unit 41 is incident into the incident portion 23 and diffused within the light-penetrable region 24 to become a surface light source. The second LED unit 42 is disposed within the mounting space 11, and the second LED unit 42 overlaps with the light-penetrable region 24 and is configured to light to form at least one point light source. The light form the first LED unit 41 and the light from the second LED unit 42 emit out from the light-penetrable region 24, at the same time or respectively. The LED units are energy-saving, durable bright.

As viewed in a direction perpendicular to the light-penetrable region 24, when the first LED unit 41 and the second LED unit 42 light, the light-penetrable region 24 appears two emitting modes (surface light source and point light source) at the same time, thus providing various alarm modes. For example, the first LED unit 41 keeps lighting (surface light source), and the second LED unit 42 is controllably activated to light (point light source) when an emergency such as braking occurs, which provides an obvious alarm; however, the first LED unit 41 and the second LED unit 42 can be exchanged in function. Whereby, the integrated lamp is small in size and will not increase the volume of the object such as vehicle body to which the integrated lamp is attached.

Specifically, the first LED unit 41 is disposed on a first printed circuit board 51, and the second LED unit 42 is disposed on a second printed circuit board 52. As viewed in a first direction 91, the light-evening member 2, the first printed circuit board 51 and the second printed circuit board 52 are arranged to overlap with one another in order. The first printed circuit board 51 includes a through structure 511 arranged along the first direction 91 and corresponds to the second LED unit 42.

Specifically, the first LED unit 41 includes a plurality of first LEDs, the second LED unit 42 includes a plurality of second LEDs, and the through structure 511 includes a plurality of through holes. A number of the plurality of through holes is equal to that of the plurality of second LEDs. Preferably, the plurality of first LEDs are disposed on a periphery of the first printed circuit board 51, to increase the lighting area of the surface light source. The plurality of through holes and the plurality of second LEDs are located at a middle of the first printed circuit board 51, to be attractive to eyes.

In this embodiment, a number of the plurality of first LEDs is greater than that of the plurality of second LEDs, and the plurality of second LEDs are equidistantly arranged. The first and second printed circuit boards 51, 52 abut in surface contact in the first direction 91, and the second LED unit 42 is located within the through structure 511, so that the light can sufficiently emit out from in the first direction 91.

Preferably, the luminance of the second LED unit 42 is greater than that of the first LED unit 41, thus being more attractive and providing better alarming effect.

Figure 6:
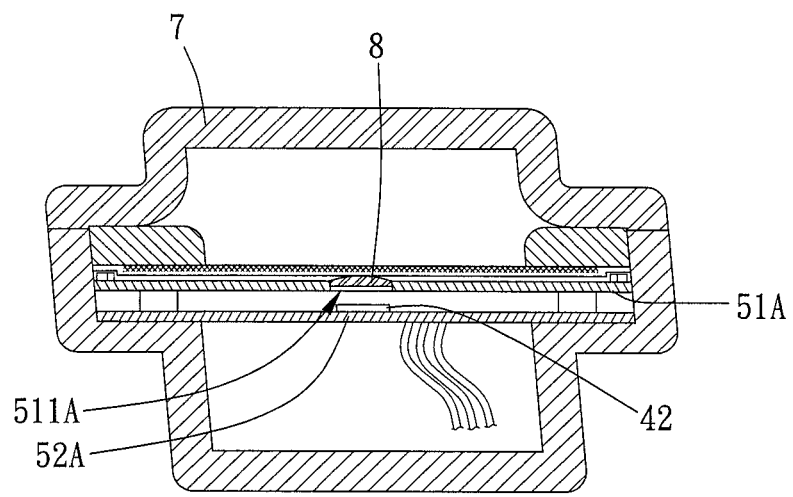
FIG. 6 is a cross-sectional drawing of a second preferred embodiment of the present invention.

Another preferred embodiment may has a configuration as one in a second embodiment as shown in FIG. 6. A convex lens unit 8 covers the through structure 511A, and a part of the light from the second LED unit 42 goes through the convex lens unit 8, to focus the light to improve the point light source. In other words, it advances attraction to eyes and alarming effect. It is noted that the distance between the first printed circuit board 51A the second printed circuit board 52A may be changed according to various requirements of luminance of the point light source or the focal length of the convex lens unit 8.

As shown in FIGS. 1-5, the integrated lamp further includes a light-shielding unit 6. As viewed in the first direction 91, the light-shielding unit 6 covers the first LED unit 41, and the light from the first LED unit 41 emits out in a second direction 92. In this embodiment, the second direction 92 passes through the incident portion 23 so that the light from the first LED unit 41 comes into the light-penetrable region 24, wherein the second direction 92 is transverse to the first direction 91.

The first LED unit 41 has an emitting face 43 preferably facing toward a direction transverse to a direction toward which an emitting face 44 of the second direction 92, wherein the emitting face of the second LED unit 42 preferably faces directly toward the first direction 91. As a result, the first LED unit 41 and the second LED unit 42 can provide surface and point light sources with greater luminance.

It is noted that the light-evening member 2 is preferably flexible and transparent, thus being good for fitting assembling and transparency. Specifically, the light-evening member 2 preferably includes a main body 21 and a sheet member 22, the main body 21 is greater than the sheet member 22 in thickness, the sheet member 22 is connected with and extends laterally from a first end surface 211 of the main body 21, and the sheet member 22 and a second end surface 212 of the main body 21 are in a stepped configuration. The light-penetrable region 24 is disposed on the main body 21, an annular lateral side 213 of the main body 21 servers as the incident portion 23, and the first LED unit 41 is disposed opposite to the annular lateral side of the main body 21. The second end surface of the main body 21 is closer to the first printed circuit board 51 than the first end surface of the main body 21.

A cross-section of the light-evening member 2 taken along the first direction is of a thin wide T-shape. The sheet member 22 is clamped between the light-shielding unit 6 and the first LED unit 41, thus avoiding friction and damage of the light-shielding unit 6 and the first LED unit 41 and stably positioning the light-penetrable region 24.

Preferably, a light-guiding structure 3 which is honeycomb-shaped is disposed on the light-penetrable region 24, to evenly diffuse the light to provide a surface with good quality. The integrated lamp may further include a light-diffusing cover 7, and the light-diffusing cover 7 is disposed on the shell member 1 and covers the light-penetrable region 24. The light-diffusing cover 7 can even and broaden the light. In addition, since the light-diffusing cover 7 has high transparency so that the luminance is good without being affected. It is noted that the light-diffusing cover 7 also provides light-evening effect as the light-evening member 2 does. As a result, the light-evening member may be omitted in other embodiments.

In sum, the integrated lamp uses the LEDs as light sources, which provides great brightness, and being durable and energy-saving. The first LED unit lights as a surface light source and the second LED unit lights as a point light source, thus providing various alarm modes. The light from the first and second LED units emit out from the light-penetrable region, thus being small in size and will not increase the volume of the object such as vehicle body to which the integrated lamp is attached.

While we have shown and described various embodiments in accordance with the present invention, it should be clear to those skilled in the art that further embodiments may be made without departing from the scope of the present invention.

What is claimed is:
1. An integrated lamp, including:
a shell member, defining a mounting space;
a light-evening member, disposed within the mounting space, including an incident portion and a light-penetrable region;
a first LED unit, disposed within the mounting space, at least part of light from the first LED unit being incident into the incident portion and diffused within the light-penetrable region;
a second LED unit, disposed within the mounting space, overlapping with the light-penetrable region;
wherein the light form the first LED unit and the light form the second LED unit emit out from the light-penetrable region, at the same time or respectively;
a light-shielding unit;
wherein the first LED unit is disposed on a first printed circuit board, the second LED unit is disposed on a second printed circuit board, as viewed in a first direction, the light-evening member, the first printed circuit board and the second printed circuit board are arranged to overlap with one another in order, and the first printed circuit board includes a plurality of through holes arranged along the first direction and corresponding to the second LED unit;
wherein as viewed in the first direction, the light-shielding unit covers the first LED unit, the light from the first LED unit emits out in a second direction, the second direction passes through the incident portion so that the light from the first LED unit comes into the light-penetrable region, and the second direction is transverse to the first direction;
wherein the first LED unit has an emitting face facing toward a direction transverse to a direction toward which an emitting face of the second LED unit faces; the first and second printed circuit boards abut in surface contact in the first direction, and the second LED unit is located within the through holes; a light-guiding structure which is honeycomb-shaped is disposed on the light-penetrable region; the integrated lamp further includes a light-diffusing cover, the light-diffusing cover is disposed on the shell member and covers the light-penetrable region; the luminance of the second LED unit is greater than that of the first LED unit; the light-evening member is flexible and transparent; the light-evening member further includes a main body and a sheet member, the main body is greater than the sheet member in thickness, the sheet member is connected with and extends laterally from a first end surface of the main body, the sheet member and a second end surface of the main body are in a stepped configuration, the light-penetrable region is disposed on the main body, an annular lateral side of the main body servers as the incident portion, the first LED unit is disposed opposite to the annular lateral side of the main body; the second end surface of the main body is closer to the first printed circuit board than the first end surface of the main body; the sheet member is clamped between the light-shielding unit and the first LED unit; a cross-section of the light-evening member taken along the first direction is of a thin wide T-shape; the first LED unit includes a plurality of first LEDs, the second LED unit includes a plurality of second LEDs, a number of the plurality of through holes is equal to that of the plurality of second LEDs, the plurality of first LEDs are disposed on a periphery of the first printed circuit board, the plurality of through holes and the plurality of second LEDs are located at a middle of the first printed circuit board, the plurality of second LEDs are equidistantly arranged; a number of the plurality of first LEDs is greater than that of the plurality of second LEDs.

2. The integrated lamp of claim 1, wherein a convex lens unit covers the through holes, and a part of the light from the second LED unit goes through the convex lens unit.

\* \* \* \* \*